United States Patent [19]

Bailey

[11] Patent Number: 4,728,422

[45] Date of Patent: Mar. 1, 1988

[54] SIFTING FRAME ASSEMBLY WITH DIFFERENTIALLY TENSIONED SCREENS

[75] Inventor: Marshall G. Bailey, Larachmor, Scotland

[73] Assignee: Thule United Limited, Aberdeen, Scotland

[21] Appl. No.: 756,714

[22] Filed: Jul. 19, 1985

[30] Foreign Application Priority Data

Jul. 21, 1984 [GB] United Kingdom ............... 8418658

[51] Int. Cl.$^4$ ............................................. B01D 33/22
[52] U.S. Cl. ................................... 210/314; 210/489; 210/419; 209/398; 209/399; 209/403
[58] Field of Search ............... 210/314, 319, 488, 489, 210/499; 209/379, 391, 397, 398, 399, 401, 402, 403

[56] References Cited

U.S. PATENT DOCUMENTS

| | | | |
|---|---|---|---|
| 3,666,277 | 5/1972 | Hubach et al. | 209/403 |
| 3,684,091 | 8/1972 | Wehner | 209/399 |
| 3,900,628 | 8/1975 | Stewart | 209/399 |
| 3,970,550 | 7/1976 | Fry et al. | 209/399 |
| 4,033,865 | 7/1977 | Derrick, Jr. | 209/402 |
| 4,120,785 | 10/1978 | Kanamori et al. | 209/401 |
| 4,380,494 | 4/1983 | Wilson | 209/403 |
| 4,390,420 | 6/1983 | Tenhaaf | 209/403 |
| 4,563,270 | 1/1986 | Wolff | 209/379 |

FOREIGN PATENT DOCUMENTS

1526663 9/1978 United Kingdom .
1575312 9/1980 United Kingdom .
1578948 11/1980 United Kingdom .

Primary Examiner—Richard V. Fisher
Assistant Examiner—Wanda L. Millard
Attorney, Agent, or Firm—Nelson E. Kimmelman; Louis Weinstein

[57] ABSTRACT

A filtering screen is described comprising: a first filter mesh, a second filter mesh having a different mesh size from the first and overlying the first mesh, and an apertured support to which both of the meshes are bonded so as to maintain the two meshes in tension, the tension in one of the meshes being greater than that in the other. At least one other filter mesh may be bonded over the first two meshes. The support may comprise a plate of fiber reinforced material having apertures formed therein which are much greater in area than the openings in the filter mesh, or a sheet of metal in which apertures are formed and in which edge regions of each aperture are turned through approximately 90° to extend normal to the plane of the sheet from the underside thereof to increase the rigidity of the sheet. The frame may alternatively be a honeycomb structure or an apertured metallic plate, the filter meshes being joined to the surface of the frame.

9 Claims, 16 Drawing Figures

SIFTING FRAME ASSEMBLY WITH DIFFERENTIALLY TENSIONED SCREENS

FIELD OF INVENTION

This invention relates to a screen for use in a filtering process, especially for filtering a particle-containing suspension or a slurry, and also to a method of manufacture of a filtering screen.

BACKGROUND TO THE INVENTION

Commonly, in filtering processes generally of the kind referred to, a plurality of differently-sized mesh filter elements are mounted one above the other in a vibratory cradle or the like. Each wire mesh screen may be tensioned across the cradle by use of fixing hooks. Alternatively, each single mesh screen may be mounted and possibly stretched within a screen insertable into the cradle.

OBJECT OF THE INVENTION

It is an object of this invention to provide an improved filtering screen and method of manufacture thereof, for example a filtering screen which can usefully be employed in a vibratory cradle.

SUMMARY OF THE INVENTION

According to one aspect of the present invention, a filtering screen comprises:

(a) a first filter mesh, (b) a second filter mesh having a different mesh size from the first and overlying the first mesh, and (c) an apertured support to which both of the meshes are bonded so as to maintain the two meshes in tension, the tension in one of the meshes being greater than that in the other.

The invention is not limited to the use of only two screen meshes and additional meshes having the same or different mesh size and having the same or different tension may be incorporated by bonding over the first two mentioned meshes.

By incorporating a rigid apertured support and bonding the meshes to the support, so differential tensions within the meshes can be maintained and the meshes are kept flat even under load thereby preventing migration of slurry and uneven distribution across the screen.

In one embodiment of the invention, the support comprises a fiber reinforced mat having apertures formed therein which are much greater in area than the openings in the filter mesh, first and second filter meshes resin bonded to the mat, the two filter meshes having different inherent tensions therein and the rigidity of the mat being such as to maintain the meshes in tension.

In another embodiment the screen support may be in the form of a rectilinear frame of rigid struts similar to a picture frame with transversely extending intermediate struts to define apertures within the frame and the frame maintains the desired tensions in the meshes.

In a further embodiment, the screen support is in the form of a planar assembly having a plurality of apertures therein, each aperture being many times larger in area than the mesh size of the screen, and filter cloths are securely bonded to the planar assembly so that each aperture therein can be considered to comprise an elemental sifting screen constructed in accordance with the invention.

In a further embodiment, the support may comprise a honeycomb structure having, for example, triangular, square, pentagonal or hexagonal shaped openings. Such structures are readily constructed from light weight sheet material such as paper, card and the like, impregnated if required to render the material impervious to fluids. When bonded to one or more layers of filter cloth, the overall structure becomes relatively rigid. An apertured plate may be bonded to the underside.

In a still further embodiment the support may be a rigid sheet for example of metal in which apertures are formed as by punching so that edge regions of each aperture are forced through approximately 90° to extend normal to the plane of the sheet from one surface thereof to reinforce the sheet and improve its overall rigidity, the meshes or filter cloths being bonded to the other surface of the sheet material, to maintain the desired tensions therein.

Where meshes or cloths are to be secured to an apertured support as aforesaid, the bonding may be achieved using a thermosetting adhesive, a chemically setting adhesive, or by fusion where the support structure is of an appropriate material such as a plastics material.

There is no limitation on the material which can be used for the screen support. Thus for example any of wood, steel, plastics or a composite material including fibers for reinforcement may be used, or any combination thereof.

If a honeycomb structure is employed, further reinforcing may be provided. Additionally, filter cloths may be stretched and secured across the upper or lower surface of the honeycomb structure and in this event preferably two such cloths are applied to one surface.

As is known, the use of two meshes of differing tension overlying one another enables the screen to be self-cleaning. By providing a support to which the meshes or filter cloths are bonded, the self-cleaning aspect of the invention is enhanced since the meshes or screen cloths do not need to be separately tensioned to the same extent as is the case if they are to be self supporting.

In a preferred embodiment of the invention a polyester is used to bond the mesh to a relatively rigid support of glass reinforced plastics material.

In a method of manufacture involving a honeycomb structure, the following steps are preferred:

1. coating the upper and lower surfaces of the honeycomb structure with a resin or glue so as to reinforce and increase the thickness of the edges to the apertures in the honeycomb.

2. tensioning a first screen mesh over one of the faces of the honeycomb, 3. similarly tensioning a second screen mesh over the first mesh, the tension in the second mesh being different from that in the first mesh, 4. securing the two meshes in position whilst still under tension, and 5. securing as by glueing an apertured sheet to the other face of the honeycomb structure.

A laminated timber, laminated plastics, metal or glass reinforced plastics material may be used for the sheet to be secured to the said other side of the honeycomb structure.

Alternatively where sufficient rigidity can be provided, the apertured perforated sheet material on the underside may comprise a coarse mesh typically of metal wire.

Where the material from which the honeycomb structure is formed is insufficiently strong to maintain the desired tensions in the overlying meshes, the honeycomb structure may itself be located within a rigid bounding frame of metal, plastics, wood or the like and the screen cloths or meshes may be stretched over the honeycomb structure and the bounding frame and secured not only to the honeycomb but also the bounding frame whilst being tensioned.

It is to be understood that if further rigidity is required, this may be provided by mounting the screen within a vibrating machine with parallel spaced apart bars running above and below the screen and clamping the latter therebetween.

In the event that an assembled screen is insufficiently rigid, so that curvature of the screen is produced by the differential tensions in the two cloths or meshes, it is essential that when mounted in a vibrating machine, the method of securing the screen in the machine will restore the actual desired tensions in the meshes or screen cloths so that the inherent differential tensions introduced into the screen cloths or meshes during manufacture, are restored. This may be achieved by suitably clamping the screen in the machine.

Where a fiber reinforced material is used for the screen support, the fibrous material may be fiberglass, Kevlar (registered trade mark), carbon fiber, metal fibers, or organic fibers such a hemp.

The support preferably has a regular pattern of apertures.

The meshes of screen cloths are preferably formed from woven wire.

Typical mesh sizes are 12 wires per cm (30 wires per inch) and 60 wires per cm (150 wires per inch), the coarser mesh always being the mesh which is in contact with the support and the finer mesh (60 wires per cm) being secured over the coarser mesh.

Where a reinforced fiber support is used such as woven glassfiber mat, the latter is preferably apertured or formed with apertures and pre-impregnated with a resin typically an epoxy or polyester based bonding agent together with hardener. The first wire mesh may be bonded in position and allowed to set hard before the second resin layer is applied over the surface of the mat around the apertures therein to enable the second mesh to be bonded in position. In either case the wire mesh is independently tensioned to the desired amount before bonding so that differential tensions can thereby imparted to the two meshes.

Alternatively both meshes may be tensioned over the support before the resin and hardener are applied.

The bonding step is preferably aided by the application of heat and pressure applied by a press or by means of rollers.

The differential tensioning allows one mesh to flap against the other during vibration so as to render the screen self-cleaning.

By using differential heating while the wire meshes are being bonded in position or using a suitably shaped former or a combination thereof, a permanent set may be induced into the overall screen should this be required and in particular a corrugated profile may be achieved in this way.

Where a resin is used together with a hardener which is inactive at normal ambient temperatures but which can be activated by raising the temperature, the heating step becomes essential in the above method if only to activate the hardener and cause bonding.

DESCRIPTION OF DRAWINGS

The invention will now be described, by way of example, with reference to the accompanying drawings, in which.

DETAILED DESCRIPTION OF DRAWINGS

Figure 1:
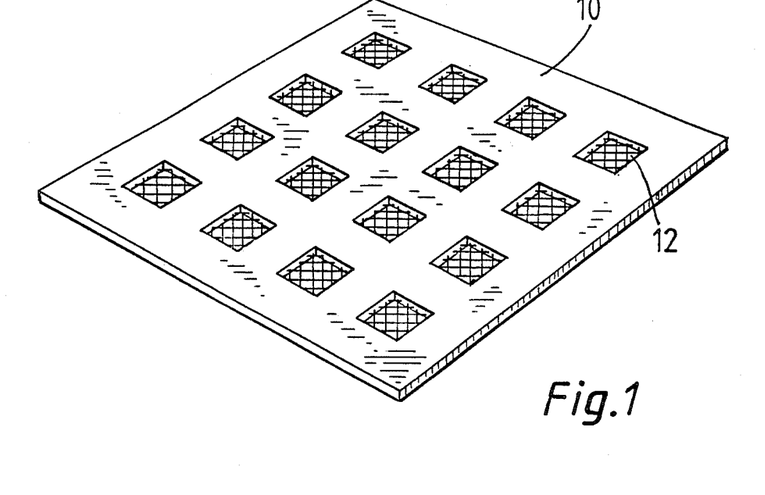
FIG. 1 is a perspective view of a filtering screen constructed in accordance with the invention.
Figure 2:
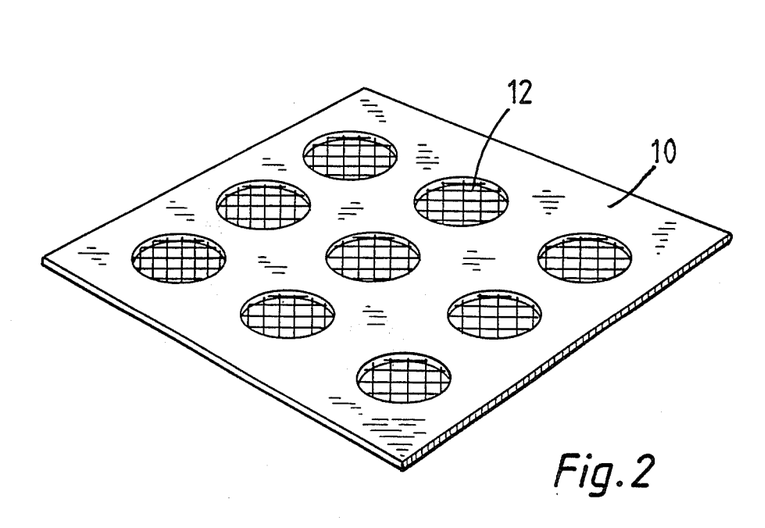
FIG. 2 is a similar view of another such screen.

FIG. 1 shows a filtering screen having a glassfiber mat 10 formed by correspondingly apertured top and bottom layers between which are sandwiched in position at least two stainless steel wire meshes 12 bonded in position by layers of resin. FIG. 2 shows an analogous screen, but with circular apertures in the mat 10 instead of square apertures.

Figure 3:
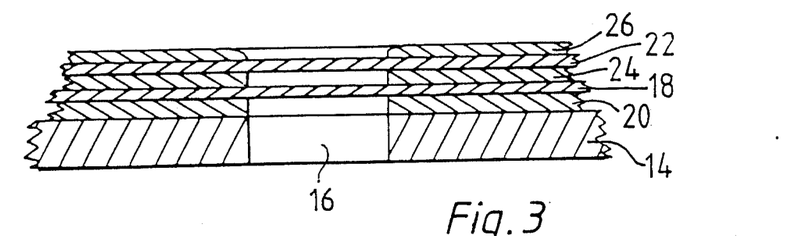
FIGS. 3 to 6 show differing screen constructions in cross-section.

The details of one possible screen construction are shown in FIG. 3. A resin mat 14 having apertures of which one is shown at 16 has a first wire mesh 18 bonded thereto by a resin layer 20. A second wire mesh 22 is bonded on top through a second resin layer 24. A thin resin layer 26 also exists on top of the second wire mesh.

Figure 4:
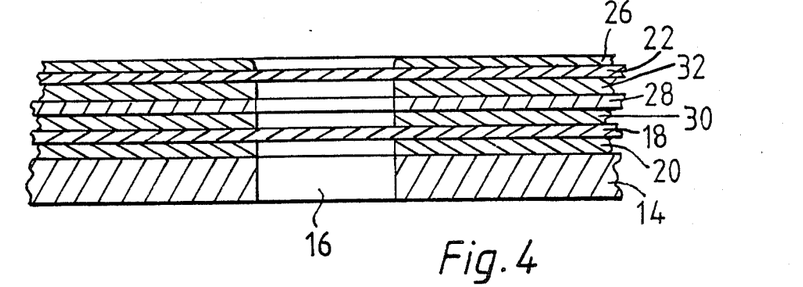

The construction of FIG. 4 is generally similar, but a thin fiberglass mat forms a layer 28 bonded by resin layers 30 and 32 between the first and second meshes 18 and 22.

Figure 5:
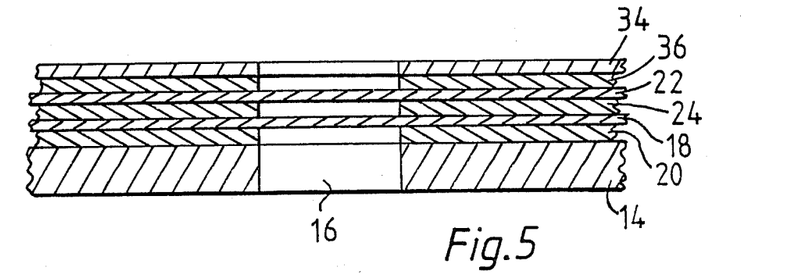

The construction of FIG. 5 is also generally similar to that of FIG. 3, but a thin fiberglass mat 34 is provided as a top layer, bonded in position by resin layer 36 on top of the second mesh 22.

Figure 6:
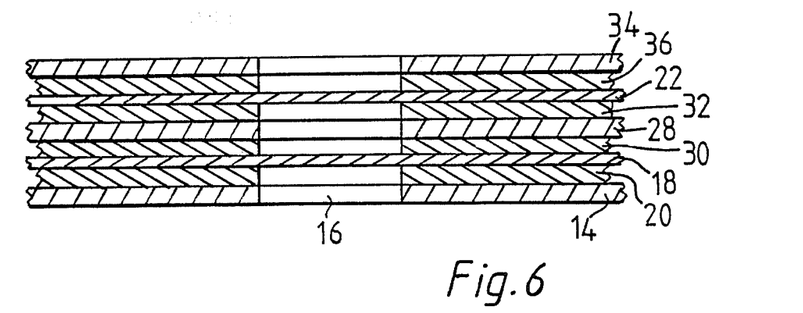

The construction of FIG. 6 utilises the thin fibreglass mat 28 of FIG. 4 and the uppermost fiberglass layer 34 of FIG. 5.

Figure 7:
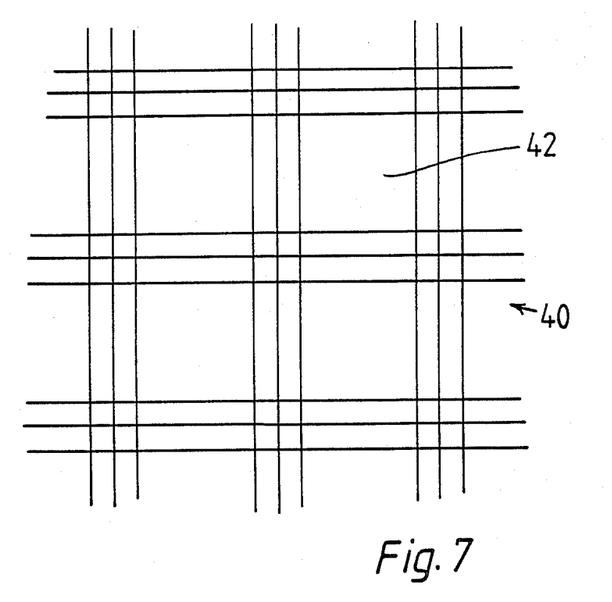
FIG. 7 shows a woven glassfiber mat in which the apertures are formed during the weaving stage.

FIG. 7 illustrates woven glassfiber mat 40. The weft and warp fibers define sqaure apertures 42.

Figure 8:
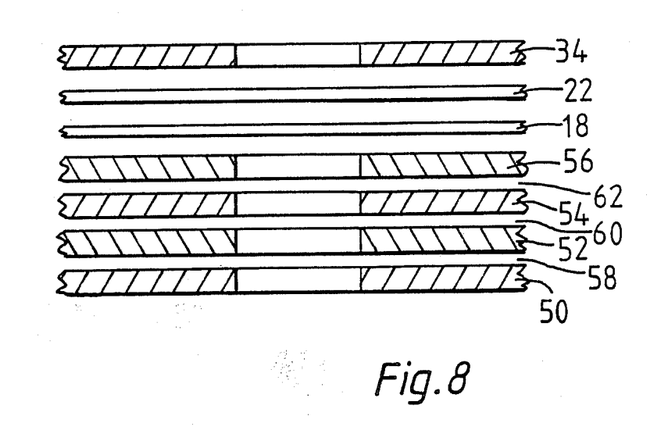
FIG. 8 shows a further screen construction in cross-section.

Finally, FIG. 8 illustrates a still further construction of filtering screen wherein four layers of fiberglass mat 50, 52, 54 and 56 bonded by resin layers 58, 60, 62 are employed beneath first and second meshes 18 and 22, and an uppermost fiberglass layer 34 is also employed.

A preferred bonding agent is epoxy or polyester-based, incorporated with a hardener which is activated by application of heat. The wire meshes may be bonded in position successively, during separate bonding steps, and may be selectively and differentially tensioned while the resin is setting. Alternatively the wire meshes may be separately tensioned one above the other and the bonding may be carried out in a single step. The lower mesh 18 will be a substantially coarser mesh than the upper mesh 22.

The sandwich is preferably squeezed during bonding. In the case of the constructions of FIGS. 3 and 4, this results in the second mesh 22 becoming embedded in the resin. The application of squeezing pressure can be combined with shaping, which can be achieved either by differential heating or, for more complex shaping, by pressing over a former, or by a combination of such methods.

Figure 9:
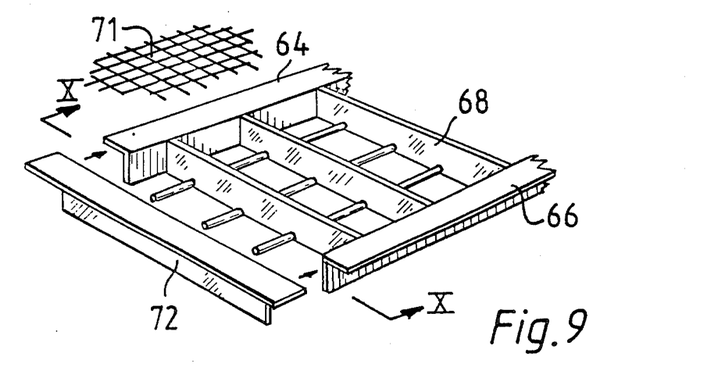
FIG. 9 illustrates in perspective part of an alternative form of support.
Figure 10:
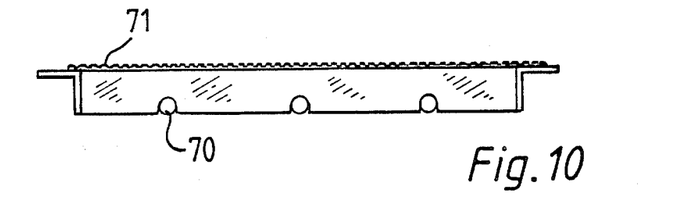
FIG. 10 is a cross-section through FIG. 9 on the line 10—10.

In FIG. 9 an alternative support is shown comprising angled members 64 and 66 between which extend rigid bars such as 68, typically welded at their ends. As shown in FIG. 10 each bar is cut away on its underside to accommodate transversely extending rods such as 70. Also as shown in FIG. 10 the upper surface of the bars 68 and the out turned flanges of the members 64 ad 66, are coplanar and two or more meshes typically of woven wire as at 71 can be stretched over the frame and secured to the coplanar surfaces of the members 64, 66 and 68 using a suitable adhesive.

The frame may be completed by means of members such as 72 which again may be welded or otherwise secured to the side struts 64 and 66.

Figure 11:
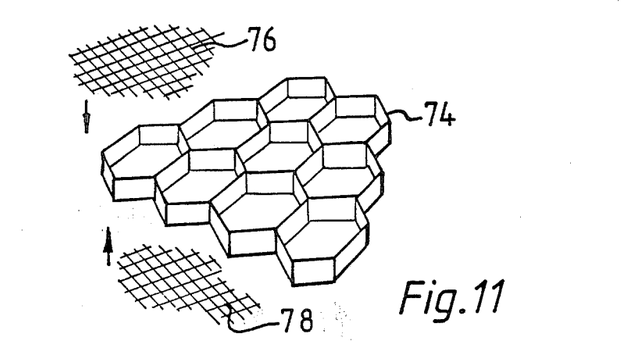
FIG. 11 is a perspective view showing a honeycomb support.
Figure 12:
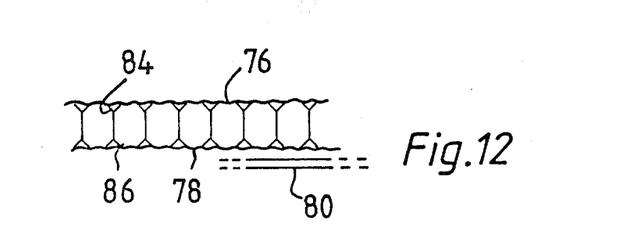
FIG. 12 is a cross-section through the structure of FIG. 11.
Figure 13:
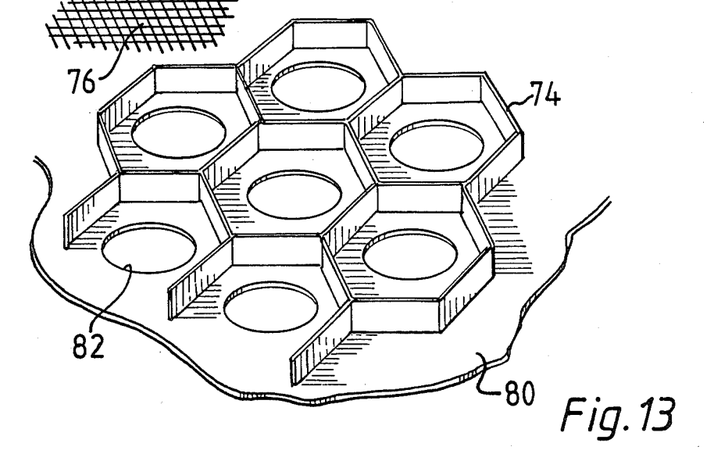
FIG. 13 shows an alternative and preferred screen incorporating a honeycomb sandwich.

FIGS. 11, 12 and 13 refer to an alternative support which uses a honeycomb insert. The latter is designated by reference numeral 74 in FIG. 11 and in order to improve the bonding of this to layers of mesh and/or a supporting plate, the upper and lower surfaces of the honeycomb structure may be dipped into a resin or glue or similar material so as to form runs along the edges of the honeycomb. When set, these provide a useful strengthening of the edge regions of the honeycomb structure.

Two or more screen cloths or meshes one of which is shown at 76 are stretched over the honeycomb structure and bonded to the upper surface. Either a coarse mesh 78 (as shown in FIG. 12) or a supporting plate 80 (as shown in FIG. 13), is secured by bonding to the underside of the honeycomb structure.

Where a plate such as 80 is used, the latter is apertured as at 82 and typically the apertures are aligned with the openings in the honeycomb structure.

In the cross-section in FIG. 12, the reinforced upper and lower edges of the honeycomb are readily visible at 84 and 86.

Figure 14:
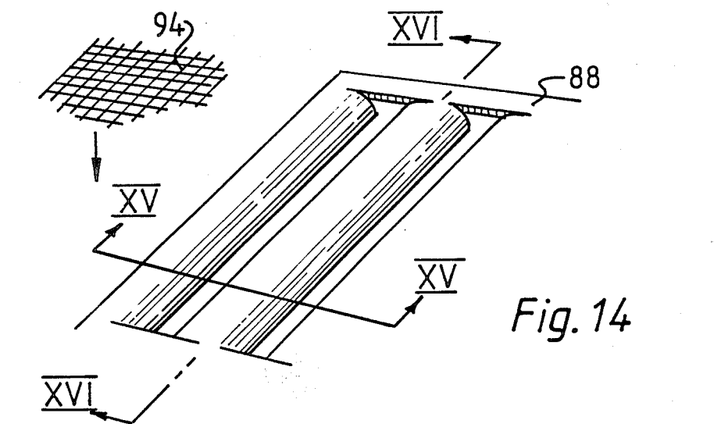
FIG. 14 illustrates a further punched plate support.
Figure 15:
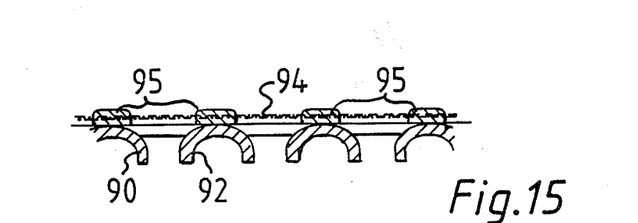
FIG. 15 is a cross-section on the line 15—15 in FIG. 14.

FIG. 14 shows a further alternative support in the form of a plate 88 which may be of sheet steel having apertures punched therein as best seen by comparing FIGS. 14 and 15. Each of the punchings causes not only an aperture to appear but also two lips of metal to protrude below the aperture as at 90 and 92 in FIG. 15, which reinforce the edge regions of the apertures. The presence of these downturned lips also increases the overall rigidity of the sheet material 88.

Two or more such screen meshes such as 94 differently tensioned as required, are bonded to the upper surface of the sheet material using a suitable adhesive, as shown at 95.

Figure 16:
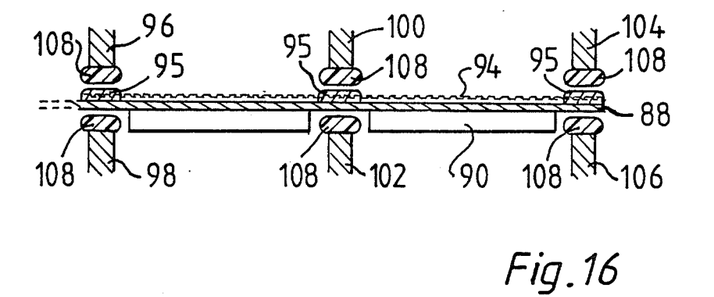
FIG. 16 is a cross-section on the line XVI—XVI in FIG. 14.

In each embodiment described herein the screen meshes may be of woven wire and are tensioned before they are bonded to the chosen support, the latter serving to maintain the differential tensions in the meshes after assembly.

Where the rigidity of the plate 88 is insufficient to ensure the maintenance of the desired tensions in the screen cloths, it may be supported in a vibratory machine between upper and lower pairs of elongate supports, shown in section in FIG. 16, at 96, 98, 100, 102 and 104,. Rubber or other elastomeric material noses may to advantage be fitted to the ends of the supports 96, 98 etc, as indicated at 108. Conveniently, the supports are aligned with the bonded regions 95.

Whether rigid or not, all of the screens described herein are intended to be firmly clamped in a vibratory screening machine, in use.

I claim:

1. A sifting screen assembly for use in a vibratory sifting machine comprising:
    a frame;
    upper and lower cloth screens each made up of sets of strands, the strands of each set crossing the strands of the other set, said cloth screens being adhesively secured at their peripheries around the frame under different tensions which enable said upper and lower cloth screens to vibrate differentially,
    said upper and lower screens being relatively positioned having regard to their mesh sizes such that strands of the lower cloth screen align with the openings in the upper cloth screen,
    a supporting cloth screen adhesively secured along its periphery to the frame to underlie the said lower cloth screen under a tension greater than the tensions of said upper and lower cloth screens, and
    said supporting cloth screen being of coarser mesh than the meshes of the lower and upper cloth screens and serving as a support for maximizing the unclogging action which occurs as the upper and lower differentially vibrating cloth screens strike one another, with the strands of the lower cloth screen penetrating the openings of the upper cloth screen to significantly improve the unclogging action of the screen;
    said frame being a rectilinear frame of rigid struts similar to a picture frame with transversely extending intermediate struts to define apertures within the frame,
    said frame comprising a plate of fiber reinforced material having apertures formed therein which are much greater in area than the openings in the cloth screens, said cloth screens being bonded by a bonding agent to said frame over substantially the entire surface area of said frame, thereby securing the screens to said frame and maintaining the differential tensioning of the screens.

2. A sifting screen assembly as claimed in claim 1, in which at least one other filter mesh is bonded over the upper and lower screens.

3. A sifting screen assembly according to claim 2 wherein the bonding agent is a thermosetting adhesive or a chemically setting adhesive.

4. A filtering screen as claimed in claim 1, wherein the bonding agent is a thermosetting adhesive or a chemically setting adhesive.

5. A sifting screen assembly as claimed in claim 1, wherein the frame is an apertured support which is flexible and is adapted to be flattened on being fitted into a sifting machine so as to restore the desired differential tensions in the meshes on being fitted therein.

6. A sifting screen assembly for use in a vibratory sifting machine comprising:
    a frame;

upper and lower cloth screens each made up of sets of strands, the strands of each set crossing the strands of the other set, said cloth screens being adhesively secured at their peripheries around the frame under different tensions which enable said upper and lower cloth screens to vibrate differentially, said upper and lower screens being relatively positioned having regard to their mesh sizes such that strands of lower cloth screen align with the openings in the upper cloth screen, a supporting cloth screen adhesively secured along its periphery to the frame to underlie the said lower cloth screen under a tensiong greater than the tensions of said upper and lower cloth screens, and said supporting cloth screen being of coarser mesh than the meshes of the lower and upper cloth screens and serving as a support for maximizing the unclogging action which occurs as the upper and lower differentially vibrating cloth screens strike one another, with the strands of the lower cloth screen penetrating the openings of the upper cloth screen to significantly improve the unclogging action of the screen;

said frame being a rigid sheet of metal in which apertures are formed and in which edge regions of each aperture are turned through approximately 90° to extend normal to the plane of the sheet from the underside thereof to increase the rigidity of the sheet, said apertures being much greater in area than the openings in said cloth screens, said cloth screens being bonded by a bonding agent to said frame over substantially the entire surface area of said frame surrounding said apertures to maintain the differential tensioning of said cloth screens.

7. A sifting screen assembly according to claim 6 wherein the bonding agent is a thermosetting adhesive or a chemically setting adhesive.

8. A sifting screen assembly for use in a vibratory sifting machine comprising:

a frame;

upper and lower cloth screens each made up of sets of strands, the strands of each set crossing the strands of the other set, said cloth screens being adhesively secured at their peripheries around the frame under different tensions which enable said upper and lower cloth screens to vibrate differentially, said upper and lower screens being relatively positioned having regard to their mesh sizes such that strands of lower cloth screen align with the openings in the upper cloth screen, a supporting cloth screen adhesively secured along its periphery to the frame to underlie the said lower cloth screen under a tension greater than the tensions of said upper and lower cloth screens, and said supporting cloth screen being of coarser mesh than the meshes of the lower and upper cloth screens and serving as a support for maximizing the unclogging action which occurs as the upper and lower differentially vibrating cloth screens strike one another, with the strands of the lower cloth screen penetrating the openings of the upper cloth screen to significantly improve the unclogging action of the screen;

said frame being a honeycomb structure with the openings defined by said honeycomb structure being substantially greater in surface area than the openings of said cloth screens, said cloth screens being bonded by a bonding agent to one side of said honeycomb structure to maintain the differential tensioning of said cloth screens.

9. A sifting screen assembly according to claim 8 wherein the bonding agent is a thermosetting adhesive or a chemically setting adhesive.

* * * * *